Aug. 14, 1923.
C. D. BREITZKE
1,464,969
LICENSE PLATE HOLDER AND ILLUMINATOR
Filed March 24, 1922    2 Sheets-Sheet 1
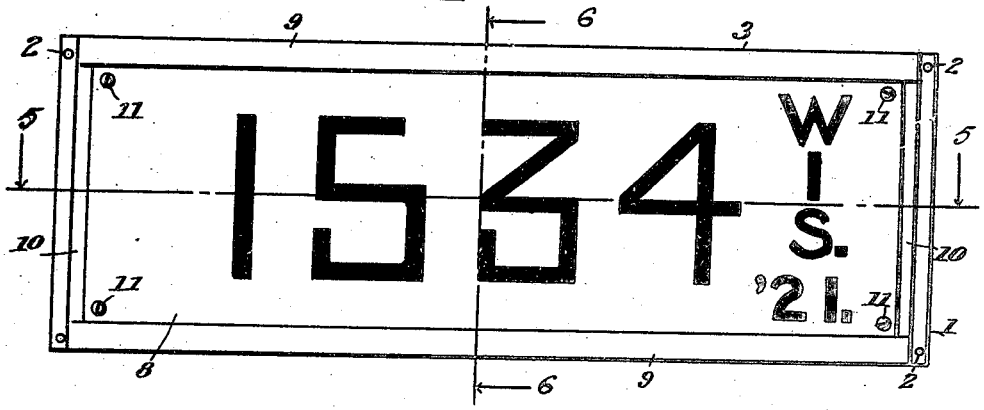
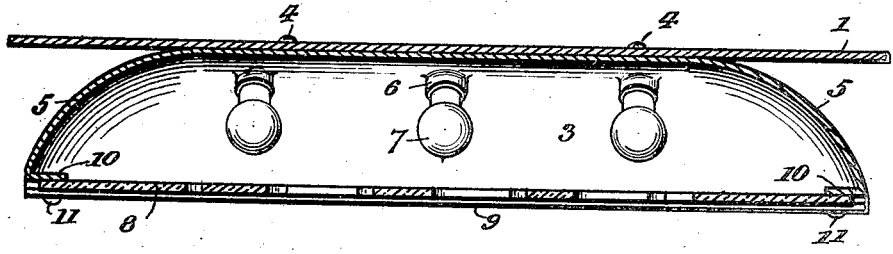
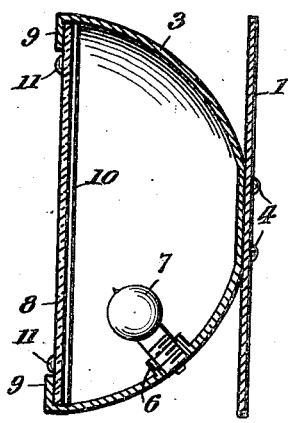
Inventor
C. D. Breitzke.
By William J. Jacobi
Attorney Aug. 14, 1923.
C. D. BREITZKE
1,464,969
LICENSE PLATE HOLDER AND ILLUMINATOR
Filed March 24, 1922          2 Sheets-Sheet 2
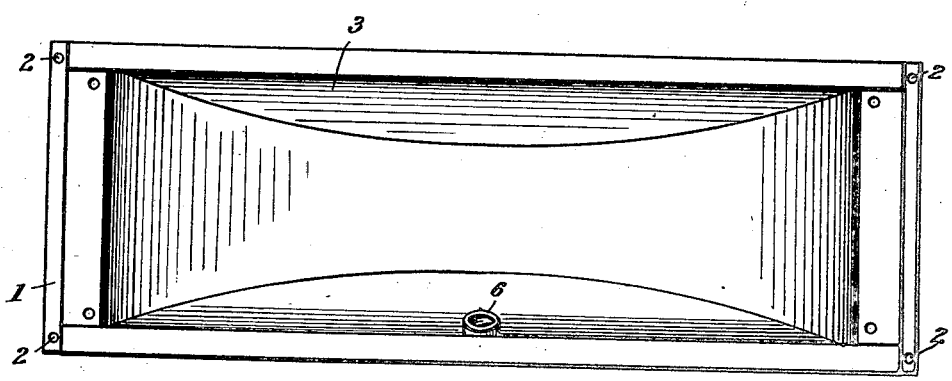
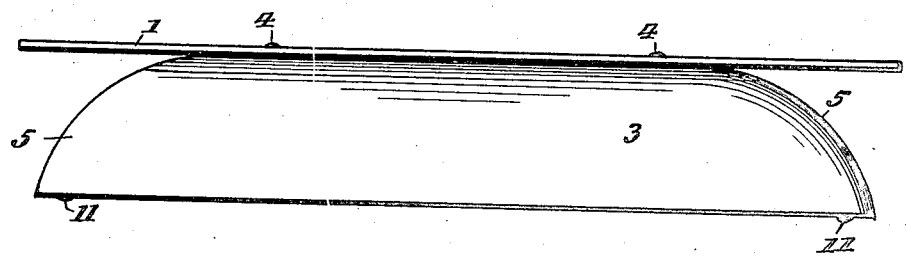
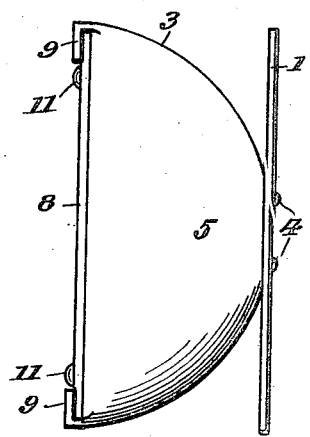
Inventor
C.D. Breitzke.
By William J. Joerling
Attorney Patented Aug. 14, 1923.

1,464,969

UNITED STATES PATENT OFFICE.

CHARLES D. BREITZKE, OF MADISON, WISCONSIN.

LICENSE-PLATE HOLDER AND ILLUMINATOR.

Application filed March 24, 1922. Serial No. 546,245.

*To all whom it may concern:*

Be it known that I, CHARLES D. BREITZKE, a citizen of the United States, residing at Madison, in the county of Dane and State of Wisconsin, have invented certain new and useful Improvements in License-Plate Holders and Illuminators, of which the following is a specification.

This invention has relation to certain new and useful improvements in a license plate holder and illuminator for motor vehicles and has for its primary object the provision of a device of this character which may be readily mounted on vehicles of various types so as to properly support the license plate in a manner which will permit the number, the name and the State granting the license to be readily observed at a considerable distance even in time of darkness.

The invention has for another object the provision of a device of the character stated which will be of extremely simple and inexpensive construction and to which the license plate may be readily secured so as to be properly positioned and illuminated according to the State or National written regulations and laws relating to such matters.

A further object of the invention resides in the provision of a device of the character stated in which the casing carried by the supporting plate may serve not only as the supporting means for the license plate but also as the casing for the illuminating lamp and the reflector so that the numbers and other characters on the license plate may be readily observed when the license plate is carried by the device positioned properly on the opposite ends of the motor vehicle.

The invention has for a still further object the provision of a device of the character stated which will be composed of the minimum number of parts, comparatively inexpensive and may be adapted to comply with the regulations of various States in reference to such matters and serve as a protection to the parties adapting the same as well as other parties and in fact the general public.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1 is a front elevation of the complete device with the license plate in position.

Figure 2 is a view similar to Fig. 1 with the license plate and lamp removed.

Figure 3 is a top plan view of the complete device.

Figure 4 is an end elevation of the complete device.

Figure 5 is a longitudinal horizontal section substantially on the plane of line 5—5 of Fig. 1, looking in the direction indicated by the arrows.

Figure 6 is a transverse vertical section substantially on the plane of line 6—6 of Fig. 1, looking in the direction indicated by the arrows.

Referring more in detail to the drawings in which similar reference characters designate corresponding parts throughout the several views, 1 indicates the supporting plate which may be secured to the motor vehicle by suitable securing members passed through the openings 2 of the corner portions of the plate 1 and while this plate is shown as being of rectangular form, it may be of any construction desired. The plate 1 serves to support the casing 3 which is also of rectangular form and has a flat rear portion secured on the outer face of the supporting plate 1, as will be readily understood by referring to the drawings. The casing 3 may be secured in position on the plate 1 by securing members 4 or by any other method or means. The casing 3 has its sides curved outwardly and the end portions 5 of the casing 3 are also curved outwardly, as shown clearly in Figs. 3 and 5. The casing 3 has suitable openings in one portion, preferably the lower side thereof, with inwardly directed flanges 6 around the openings to receive electric lamps 7 or bulbs which may be connected with any suitable source of electric energy, not shown, for lighting the lamps or bulbs 7. The casing 3 may be of metal or any other suitable material and the inner face of the casing sides and ends should be constructed in such a manner as to serve as a reflector for clearly illuminating the license plate secured to the outer open side of the casing, as will be described in detail.

The entire outer side of the casing is closed by the license plate 8 which may be formed of metal, celluloid or any other suitable material and which may have the license number, the name of the State and the date cut therein or painted or stamped upon the license plate in any preferred and well known manner. In order to properly support the license plate 8 the casing 3 has its longitudinal free edges turned back to form the supporting upper and lower flanges 9. The end edges of the casing 3 are also turned back to form the supporting end flanges 10 and these supporting end flanges 10 are offset inwardly from the flanges 9, so as to provide a receiving groove for the license plate 8. It is therefore evident that the license plate 8 must be inserted or removed from one end of the casing and the license plate 8 may be secured in proper position by suitable securing members 11 passed through corner portions thereof and through the inwardly offset end flanges 10, as shown clearly in Figs. 1, 2, 4, 5 and 6. It is evident from the formation of the casing 3 and the manner of supporting the license plate 8 thereon, the numbers and other characters on the license plate may be clearly illuminated so as to be seen for a considerable distance when the motor vehicle is traveling at a considerable rate of speed.

It is believed that the complete construction and operation of this device may now be readily understood by referring to the foregoing paragraphs taken in connection with the accompanying drawings and further detailed description is unnecessary. It may be briefly stated, however, that the entire device may be readily mounted on or removed from a motor vehicle and properly positioned so that the license plate may be read from a distance when the motor vehicle is traveling at night and without the necessity of stopping the machine.

It is believed that the complete construction and advantages of this device may now be apparent to parties familiar with the art. It is to be understood that minor changes in the details of construction and arrangement of parts may be resorted to within the scope of what is claimed without departing from the spirit of the invention.

It is to be understood that the casing 3 may be constructed of any size desired, or in proportion to the indicia carried by the plate or cover 8.

What I claim is:—

A license plate supporting an illuminating device comprising a casing formed of an arcuate central section tapering smaller towards its center, top and bottom arcuate sections connected thereto, the interior of said casing forming a reflector, inwardly extending and opposed longitudinal flanges formed on said top and bottom sections, additional inwardly bent and opposed end flanges formed on the ends of said central section, the latter flanges being disposed in a vertical plane in the rear of the plane of the first mentioned flanges, a license plate slidably supported between the aforesaid flanges, and means for securing said license plate to said end flanges, and illuminating means mounted in said casing.

In testimony whereof I affix my signature.

CHARLES D. BREITZKE.